United States Patent
Sommer et al.

(10) Patent No.: US 7,854,816 B2
(45) Date of Patent: Dec. 21, 2010

(54) METHOD OF PRODUCING A NONWOVEN FABRIC FROM FILAMENTS

(75) Inventors: Sebastian Sommer, Troisdorf (DE); Jens Güdden, Spich (DE)

(73) Assignee: Reifenhauser GmbH & Co. Maschinenfabrik, Troisdorf (DE)

( * ) Notice: Subject to any disclaimer, the term of this patent is extended or adjusted under 35 U.S.C. 154(b) by 452 days.

(21) Appl. No.: 12/008,807

(22) Filed: Jan. 14, 2008

(65) Prior Publication Data

US 2008/0264550 A1 Oct. 30, 2008

Related U.S. Application Data

(63) Continuation of application No. 10/727,091, filed on Dec. 2, 2003, now abandoned.

(30) Foreign Application Priority Data

Feb. 10, 2003 (EP) .................................. 03002932

(51) Int. Cl.
*B32B 37/00* (2006.01)

(52) U.S. Cl. .................. 156/148; 156/167; 156/181; 28/104

(58) Field of Classification Search ................ 156/166, 156/181, 148, 149; 28/104
See application file for complete search history.

(56) References Cited

U.S. PATENT DOCUMENTS

| 3,485,706 | A | * | 12/1969 | Evans | .......................... 428/134 |
| 6,903,034 | B1 | * | 6/2005 | Putnam et al. | .............. 442/408 |
| 2002/0168910 | A1 | * | 11/2002 | Vuillaume et al. | .......... 442/381 |

* cited by examiner

*Primary Examiner*—Jeff H Aftergut
(74) *Attorney, Agent, or Firm*—Andrew Wilford

(57) ABSTRACT

A laminate is made by first treating two spun-bond webs formed of endless thermoplastic synthetic-resin filaments with wetting agents. Then a layer of hydrophilic fibers is applied to one of the treated spun-bond webs and then the other of the treated spun-bond webs is applied to the layer of hydrophilic fibers on the one treated spun-bond web. Finally the two treated spun-bond webs and the layer of hydrophilic fibers between them are hydrodynamically consolidated together.

10 Claims, 2 Drawing Sheets

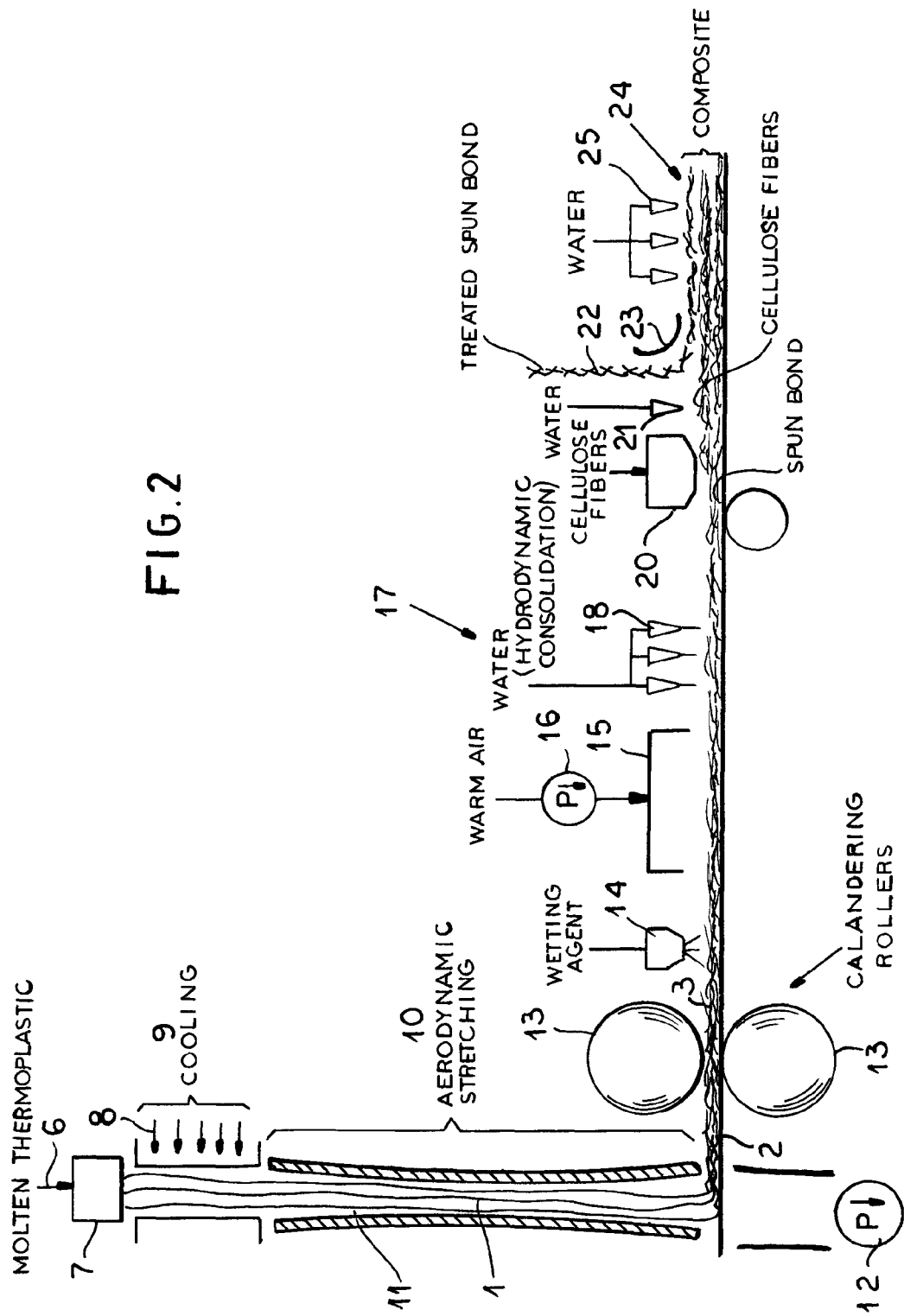

METHOD OF PRODUCING A NONWOVEN FABRIC FROM FILAMENTS

CROSS REFERENCE TO RELATED APPLICATION

This application is a continuation of application 10/727,091 filed 2 Dec. 2003, now abandoned, with a claim to the priority of European application 03 002 932.6 filed 10 Feb. 2003.

FIELD OF THE INVENTION

The present invention relates to a method of producing a nonwoven fabric, especially a spun-bond web, from filaments and especially filaments of a thermoplastic synthetic resin in which the filaments are hydrodynamically solidified.

BACKGROUND OF THE INVENTION

The production of nonwoven fabrics, fleeces and mats from thermoplastic synthetic resin filaments, hereinafter referred to as webs and especially spun-bond webs, is known. The filaments, usually endless filaments, i.e. filaments which theoretically can be continuous and are thus distinguishable from so-called staple fibers which are relatively short threads, can be collected on a surface and accumulated in a jumble or random collection of the filaments so as to produce the nonwoven web. The web itself can be fabricated in a continuous manner and the product, when composed of continuous filaments, filaments which are not intentionally broken up or filaments which can be theoretically continuous and thus as long as possible without interruption in the extrusion of the filaments from a spinneret, is known as spun bond.

The filaments collecting upon a surface tend to bond together at crossover points. The surface upon which the filaments collect can be a moving surface, preferably the surface of an endless belt which circulates below a curtain of the filaments descending from a spinneret. The filaments can be aerodynamically stretched between the spinneret and the collecting surface.

The formation of hydrodynamically consolidated spun-bond webs from filaments or endless strands can be contrasted with the formation of nonwoven webs from shorter fibers in the so-called melt-blown process. In the melt-blown process, the strands emerging from the spinneret are broken off to stable fibers and the fiber is collected on a surface. The melt-blown product has a significantly smaller amount of looping of the strands.

The spun-bond webs which have been produced heretofore have somewhat lesser degrees of a fleece characteristic than the melt blown webs and may have a lesser strength, especially because of a somewhat smaller degree of consolidation. Furthermore, spun-bond webs can show a greater tendency toward abrasion wear than is desirable. Attempts to avoid these drawbacks have led to the development of intensive hydrodynamic consolidation of the web in the case of spun bond which, in turn, leads to greater cost, especially in terms of the cost of energy used in the fabrication process and may contribute to limited production speed.

OBJECTS OF THE INVENTION

It is, therefore, the principal object of the present invention to provide a method of making spun-bond webs without the drawbacks of the earlier systems described.

More particularly, it is an object of the invention to provide a method of making hydrodynamically consolidated spun bond at lower cost and with higher production speeds than has been possible heretofore and whereby there is a more effective binding of the strands and more intensive interlooping thereof so that the fleece characteristics of the web are improved and of a satisfactory level.

It is also an object of the invention to eliminate drawbacks of earlier systems and improve the production rate and quality of a spun bond fleece or web.

SUMMARY OF THE INVENTION

These objects and others which will become apparent hereinafter are attained, in accordance with the invention, by applying to the filaments at least one wetting agent and then hydrodynamically consolidating the spun bond which is produced from the filament.

The method then comprises the steps of producing filaments of thermoplastic synthetic resin material, treating the filaments which are thus produced with at least one wetting agent and then hydrodynamically consolidating a spun-bond web formed from these filaments.

While the filaments can be treated with the wetting agent according to the invention before they are collected into the spun bon web, it is within the scope of the invention to treat the filaments as part of the spun-bond web. A treatment with the wetting agent, of course, means bringing the filaments or the spun-bond web into contact with the wetting agent and preferably coating the filaments prior to formation of the web or after formation of the web with the wetting agent.

In a highly preferred embodiment of the invention, the wetting agent is formed by at least one tenside or surface active agent (surfactant). Such a surfactant has a lipophilic part and a hydrophilic part or can be a lipophile having hydrophilic ends. The surfactant can especially be an ionic surfactant, i.e. a cationic or anionic surfactant or a mixture of both or a nonionic surfactant or a mixture thereof with either a cationic or anionic surfactant. Amphoteric surfactants can also be used.

Following the treatment with the wetting agent, preferably with a surfactant, the spun-bond web or fleece can be hydrodynamically consolidated using water jets. The water jets can be fine jets and/or high-speed jets which in effect produce water jet needling of the web, i.e. a partial entrainment of filament loops from one side of the web toward the opposite side.

The filaments from thermoplastified synthetic resin can be cooled in a curtain below the spinneret so that the filaments remain discrete and separate. The filaments can then be stretched, preferably aerodynamically and collected upon the foraminous or perforated sieve belt which travels continuously past the collecting location, i.e. an endless belt.

Preferably the application of suction below the belt facilitates the deposition of the filaments onto the perforated surface. The suction device can include one or more suction blowers. The resulting spun web is then treated with the wetting agent, preferably surfactant, and then hydrodynamically consolidated.

After the collection of the filaments into a spun bond web, the spun-bond web can be precompacted in a calender and, if not treated with the wetting agent before, can then be treated with the wetting agent. After drying and if desired, a certain ripening or aging period, the web can be subjected to the water jet needling.

The method of the invention can also be used to make multilayer products or laminates wherein, for example, a spun-bond web treated with at least one wetting agent can be joined to a further layer and the resulting combination of two layers can be subjected to hydrodynamic consolidation. A further layer of spun bond treated with the wetting agent can be applied and the three-layer composite subjected to the hydrodynamic consolidation.

The additional fiber layer which is laminated with the spun bond should be a layer of bibulous or water-absorbent fibers, especially cellulose fibers. In this case the hydrophilic fibers are sandwiched between layers which are treated with the wetting agent or surfactant.

The application of the wetting agent to the filaments, with or without drying and subsequent water jet treatment has been found to produce spun-bond webs or laminates of surprisingly advantageous properties. Especially the interlocking of the filaments is greatly improved and the filaments are caused to have runners which interlace in an optimal manner to increase the strength of the web by comparison with webs made at similar cost by earlier techniques. Especially the tensile strength of the web has been found to be improved by the invention. The abrasion sensitivity of the web is likewise reduced and the energy costs with the hydrodynamic consolidation are significantly lower than for earlier methods. At the same time the production speed can be increased.

As a general matter, with the method of the invention, combining the application of the wetting agent with the needling of the web with water jets, the mechanical properties of the spun bond web or fleece are significantly improved by comparison with spun bond fabricated without the hydrodynamic consolidation on the one hand and with spun bond which may be treated with the wetting agent on the other. These advantages are clearly unexpected based upon the knowledge in the art.

BRIEF DESCRIPTION OF THE DRAWING

The above and other objects, features, and advantages will become more readily apparent from the following description, reference being made to the accompanying drawing in which:

FIG. 2 is a more detailed diagram illustrating features of the invention.

SPECIFIC DESCRIPTION

Figure 1:
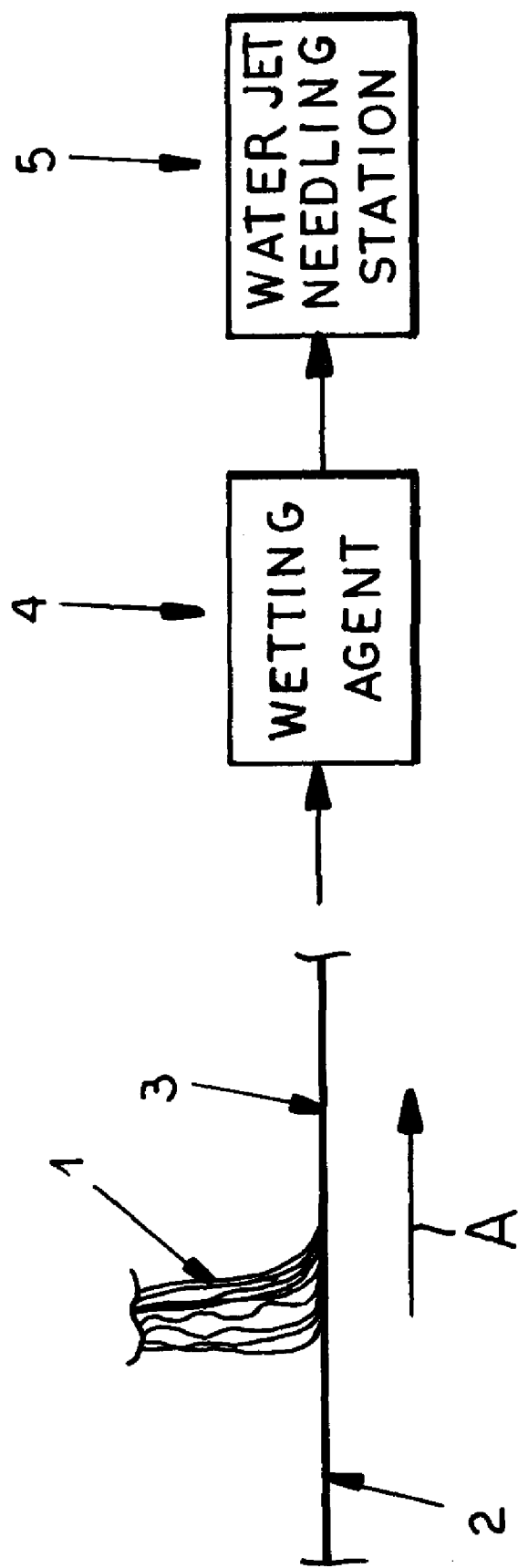
FIG. 1 is a diagrammatic illustration of the method of the invention.

The apparatus illustrated diagrammatically in FIG. 1 and representing part of a system for producing spun-bond web according to the invention includes a perforated belt 2 upon which the filaments 1 are deposited to form a spun-bond web 3. The belt 2 moves continuously past the filament deposition site as represented by the arrow A and carries the spun-bond web 3 into a first treating station 4 in which a wetting agent is applied and then into a water-jet needling station 5 in which high-pressure water jets are trained on the web 3 to consolidate the web 3 hydrodynamically.

From FIG. 2 it will be apparent that the filaments 1 can be produced from molten thermoplastic synthetic resin, supplied by a thermoplastifier as represented at 6 by a conventional spinneret 7. The filaments 1 may be cooled by cooling air supplied at 8 in a cooling zone 9 and then aerodynamically stretched in a zone 10 by passing through a Venturi-like passage 11. Below the perforated belt 2, a suction blower 12 can provide suction to draw the filaments onto the belt 2, which is endless belt and moves continuously.

In the system shown in FIG. 1, the spun-bond web 3 can initially pass between a pair of calendering rollers 13 and can then be treated with the wetting agent by a spray head 14. Optionally the spun-bond web 3 can be dried, for example under a drying hood 15 with warm air supplied by a blower 16. In the hydrodynamic consolidation zone 17, high pressure water is directed from needle jets 18 against and onto the spun-bond web 3.

If desired, a layer 19 of cellulose fibers may be dispensed onto the surface of the spun-bond web 3 by a dispenser 20 and the combination of the cellulose fibers and spun-bond web 3 supporting same may be needled with high-pressure water jets at 21.

The needling at 21 may be the first needling to which the composite is subjected if needling at 17 of the spun bond is omitted. A further layer 22 of spun bond treated with the wetting agent may then be applied at 23 and the resultant composite or laminate 24 may be subjected to hydrodynamic consolidation with high-pressure water jets from nozzles 25. The resulting product can be dried. The laminate 24 has increased strength and reduced tendency to abrasion and the composite, if formed, has in addition the highly bibulous properties contributed by the cellulose fiber.

We claim:

1. A method of making a laminate comprising the steps of sequentially:
   forming two spun-bond webs of endless thermoplastic synthetic-resin filaments;
   precompacting the spun-bond webs by calendering;
   treating the two calendered spun-bond webs with wetting agents;
   applying a layer of hydrophilic fibers to one of the treated spun-bond webs;
   hydrodynamically consolidating the layer of hydrophilic fibers and the one spun-bond web;
   applying the other of the treated spun-bond webs on the layer of hydrophilic fibers on the one treated spun-bond web; and
   hydrodynamically consolidating together the two treated spun-bond webs and the layer of hydrophilic fibers between them.

2. The method defined in claim 1 wherein the spun-bond webs are made by:
   forming endless filaments of thermoplastic synthetic resin; and
   collecting the endless filaments.

3. The method defined in claim 2 further comprising the step of
   bonding together the endless filaments at crossover points.

4. The method defined in claim 2 wherein the filaments are produced with a spinneret and are then cooled.

5. The method defined in claim 2 wherein the filaments are collected on a continuously moved foraminous belt.

6. The method defined in claim 5, further comprising drawing air through the belt from below the belt in a region at which the filaments are collected on the belt with at least one suction device.

7. The method defined in claim 5 wherein the filaments are treated with the wetting agent after the filaments have been collected into a spun-bond web on the belt.

8. The method defined in claim 5 wherein the wetting agent is a surfactant.

9. The method defined in claim 6 wherein the spun-bond webs and the layer are hydrodynamically consolidated by training water jets thereon.

10. The method defined in claim 1 wherein the hydrophilic fibers are cellulose.

\* \* \* \* \*